March 22, 1932. C. G. BUTLER 1,850,965
LUBRICATOR
Filed June 18, 1930
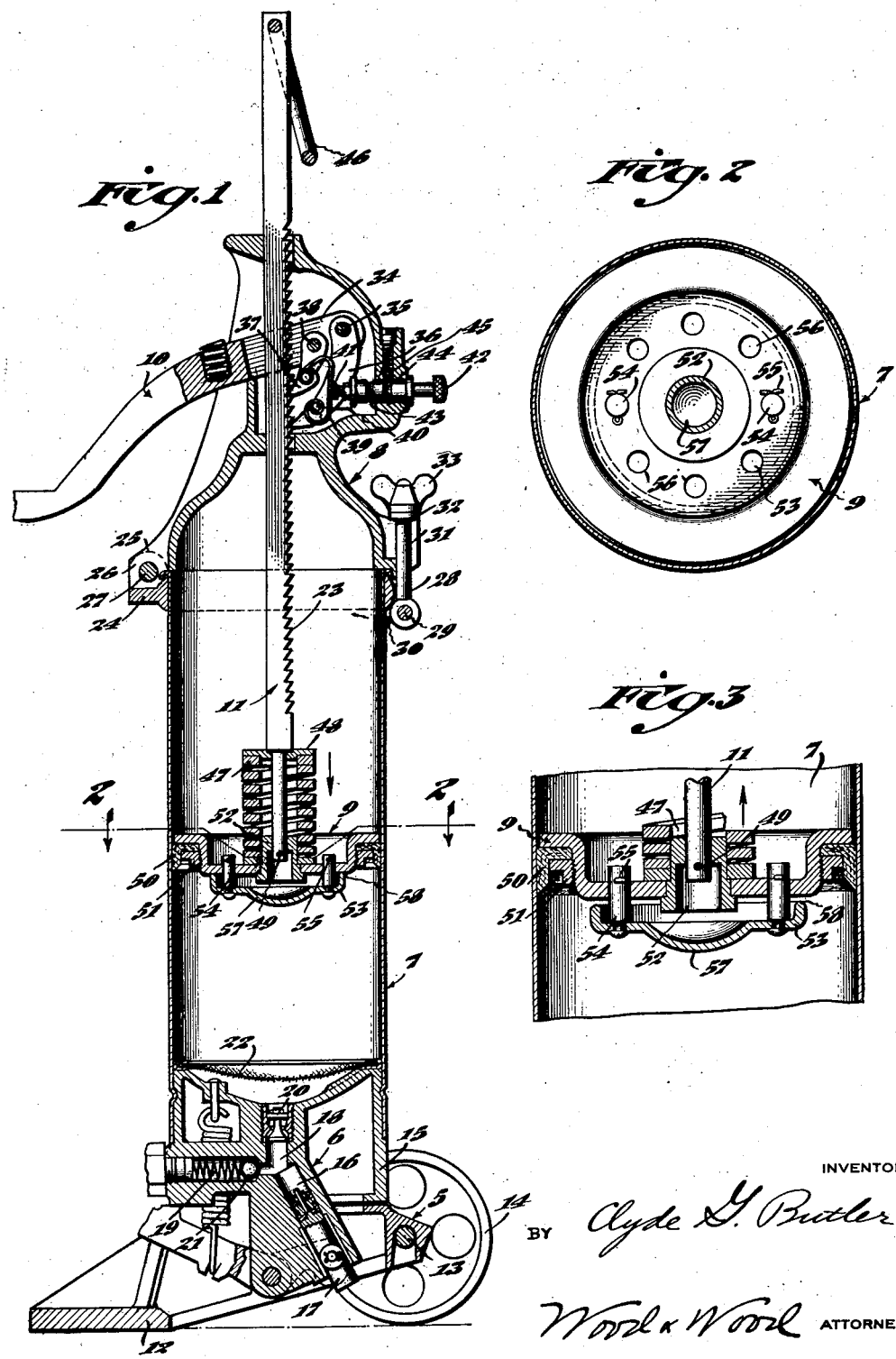
INVENTOR
Clyde G. Butler
BY
Wood & Wood ATTORNEYS Patented Mar. 22, 1932

1,850,965

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

LUBRICATOR

Application filed June 18, 1930. Serial No. 462,085.

This invention relates to improvements in high pressure lubricators or distributing pumps for supplying grease to the bearings of automobiles, which lubricators are primarily adaptable for use in service stations by virtue of the provision of a large container or reservoir readily accessible containing a considerable quantity of lubricant relative to a high pressure pump and adapted to be conveniently wheeled about on a carriage supporting the reservoir and pump as a unit.

More particularly, the invention is directed to the provision of an improved follower plate or piston mechanism provided within the large container or reservoir for continually forcing the supply of grease into the environment of the pump. The pump to which the grease is constantly supplied by this improved forcing means may be of any pressure delivery type which opens by virtue of pumping piston strokes for taking in grease from the supply in the reservoir. The present improvements are illustrated and described in relation to the high pressure lubricator disclosed and claimed in the patent to Clyde G. Butler, No. 1,737,783, granted December 3, 1929.

The character of follower means utilized for the purpose of moving the body of grease in the container toward the pump generally includes a piston or plate which is directly in contact with the body of grease and urged thereagainst by means of a piston rod which may include a rack engaged by pawls operated by means of a hand lever.

The problem which arises out of the use of a large piston forced against a body of lubricant such as grease and sealed against the walls of the container for positively feeding the grease or maintaining a pressure head thereon, is that, due to the expulsion of substantially all air from the grease containing end of the container, it is impossible to withdraw the piston after it has become fully effective for forcing the grease.

A tremendous suction acts on the underside of the piston and although a considerable leverage may be provided, extreme difficulty is had in breaking the contact and extracting the piston for returning the same to the top of the container in container refilling operations. If it is possible to break the contact with the grease, a vacuum is formed further hindering elevation of the piston.

Therefore, it is the object of this invention to provide a piston for the above purposes which includes a device for breaking the suction and eliminating any possibility of vacuum forming below the piston and to provide that the device functions automatically the moment an upward force is exerted on the piston.

The mentioned patent discloses and claims a device for accomplishing the objective herein outlined. However, the prevention of the detrimental vacuum may be accomplished in a number of ways and the present invention is designed to be an improvement over the effective device set forth in the mentioned patent.

Other objects of this invention specifically relate to the instant effectiveness of the device whereby upward movement of the piston is totally uninterfered with, the simplicity of the mounting for the device without hindrance to the normal functioning of the piston in its engagement against the grease and the efficiently guided operative movement of the device relative to the piston for insuring a positive seal in the effective stroke of the follower plate or piston.

Other objects and certain advantages will be more fully apparent from the description of the accompanying drawings, in which:

Figure 1 is a vertical central sectional view of a high pressure lubricator incorporating the present improvement in the follower plate thereof.

Figure 2 is a sectional view taken on line 2—2, Figure 1, illustrating the relief ports in the follower plate which are opened by operation of the suction breaking device of the present invention.

Figure 3 is an enlarged fragmentary view of a portion of Figure 1 detailing the follower plate and showing the valve in opened position.

Generally described, the lubricator including the present improvement, comprises, a carriage or wheeled support 5, a high pressure pump 6 mounted on the support, a container tank or reservoir 7 mounted on the pump and in communication therewith, and a cover or head 8 on the tank carrying or supporting a piston or follower plate 9 disposed within the container and a lever means 10 mounted in the cap and in engagement with the piston through a piston rod 11 for urging the same downwardly against the contents of the container.

For the purpose of giving a complete environment to the present invention, a description will be given setting forth the refinements of a high pressure lubricator or distributing pump with some omissions which are deemed proper because of their relative unimportance.

Referring to the drawings, the carriage 5 includes a trail or foot plate 12 at one end and has an axle 13 disposed through the opposite end mounted upon a pair of wheels 14—14, one at each extending end thereof. The trail plate and wheels provide the ground contact and support for the lubricator. The carriage is of hollow design suitably ribbed for the purposes of strength and for mounting the axle. Clearance is provided for the downwardly extending portions of the cylinder block 15 of the pump which is mounted upon the carriage.

The container or reservoir 7 for the grease is of cylindrical form and is connected about or inserted over the cylinder block. The block and end of the container cylinder are connected together for a sealed joint by the provision of an annular groove in the head, into which groove the metal of the container cylinder is pressed. This connection, besides insuring a sealed joint, prevents loosening of the container cylinder from the cylinder block.

The cylinder block includes the cylinder bore 16 which mounts or contains the pumping piston 17. The pumping piston may be operated manually or by power in any suitable manner, a lever being shown in this instance. The cylinder bore communicates at its inner end with the juncture of an intake conduit 18 and a discharge conduit 19, which conduits are formed within the cast cylinder block. The intake conduit or passageway 18 is disposed centrally of the cylinder head and extends downwardly from its upper end which communicates with the reservoir or container.

A check valve 20 is provided in this intake passageway, which valve opens to suction or retractive strokes of the piston and closes to discharge or forward strokes of the piston. The discharge passageway extending from the intake passageway from the point of entry of the pump cylinder contains a check valve 21 which opens to discharge or forward strokes of the piston and closes to suction strokes thereof. The effect of a suction stroke of the piston, therefore, is to fully load the conduits and cylinder between the respective valves and the piston with grease drawn in through the check valve 20 in the intake passageway and upon a forward stroke to expel a major portion of this grease through the discharge conduit. The top of the cylinder block is of concave form for directing the grease forced thereagainst into the central intake passageway. A screen or grease filter 22 is mounted upon the top surface of the cylinder block.

The follower plate or piston 9 is carried by the cover or head 8 for the reservoir or container, being hung on the lower end of the piston rod 11 operatively engaged in the head.

A jack mechanism is provided for positively forcing the piston downwardly against the grease and for compressing a spring engaging the piston which provides stored movement automatically effective for certain limits as the grease is discharged. This jack mechanism may be of any form, the form shown consisting of a rack 23 formed on the piston rod and pawls mounted within the head engaging the rack for moving the piston rod downwardly and maintaining the same in advanced position.

The head or cover 8 is of hollow construction providing a chamber for the pawls and is hinged to a support ring 24 mounted about the upper end of the container. The support ring provides a pair of upstanding spaced lugs 25 between which lugs a hinge lug 26 of the cover is disposed and secured in place by means of a hinge pin 27.

At a diametrically opposite side on the ring and head a cover clamping device is provided. This clamping or fastening device includes a bolt 28 having its lower end pivotally attached on a cross pin 29 secured in spaced lugs 30 of the ring, the bolt swinging radially of the lubricator and its upper end passing between radially extending lugs 31 of the cover. The upper surfaces of the last mentioned lugs 30 are concave or dished to provide seats for a reversely contoured washer 32 mounted on the bolts and adapted to be drawn down upon the concave surfaces by means of a wing nut 33.

The means for actuating the pawls consists of the lever 10 extending outwardly from the head for manual action and having a bifurcated inner end 34 straddling the piston rod and mounted upon a pivot pin 35 disposed in and between the walls of the head. A rack feed maintaining pawl 36 depends from the aforesaid pivot pin and a rack actuating pawl 37 is mounted between the feed maintaining pawl and the piston rod, depending from the cross pin 38 extending between the bifurcations of the lever.

The last mentioned pawl, as will be apparent from its mounting on the lever, has its pivot swung in an arc and its pawl moves in engagement with the rack or teeth on the side of the piston rod. This pawl is maintained in contact with the piston rod by means of a spring 39 coiled between studs 40 on the respective pawls. Pressure is exerted upon the spring which is of leaf form intermediate its connection to the respective studs, this pressure being effected by means of an adjustable screw 41 mounted in a plunger 42 disposed through the wall of the cover. This plunger includes an extended end suitable for hand operation and has a pair of annular groves 43, 44 therein engageable by a detent 45 for setting the plunger in two positions, one of which disposes the adjustable screw against the spring and the other of which totally disengages the same therefrom. The engaging position (shown in Figure 1) is for the purpose of normal operation of the pawl and rack and the withdrawn position is for the purpose of extraction of the piston or follower plate.

When the lever 10 is down, the tension of the spring, due to contact by the screw 41, is such that the pawls are held in engagement with the teeth of the piston rod as shown in the drawings. When the operator proceeds to elevate the lever for a new setting of the piston rod, the outer pawl 36 in engagement with the adjacent tooth on the piston rod maintains the piston in its advanced position. This pawl is, therefore, effective for maintaining the piston rod in whatever position it is left in by the downward stroke and the inner pawl 35 is moved upward for engaging a higher tooth for subsequent feed.

Downward movement of the piston is not hindered by the maintaining pawl since it merely drifts over the teeth finally dropping into the last engaged tooth when the downward movement of the lever is discontinued.

The upper end of the piston rod is provided with a ring handle 46 for pulling the follower plate or piston to its uppermost position after the pawls have been freed by release of the adjustable screw accomplished by extracting the plunger until the detent engages the inner groove 43. When the follower plate has been pulled to the uppermost position, the head may be swung back and the container cleared of the piston and thereby opened for refilling.

The piston rod is engaged with the plunger for downward movement by means of a coil spring 47 under compression between a washer 48 engaging a shoulder on the piston rod at its upper end and lying against the upper face of the piston at its lower end, the upward movement of the piston rod being limited by means of a cross pin 49 extended from the extreme lower end thereof and engaging a member of the piston. The piston is of dished form and a packing 50 is maintained against the underside of the rim thereof by means of a large flanged nut 51 screwed onto the downwardly extending wall of the piston. This packing ring is of angled form in cross section, one flange being secured against the ring by means of the nut and the other flange disposed in sealing engagement with the inner wall of the container.

The spring 47 at its lower end is disposed about a thimble 52 open at the bottom and secured within a central aperture in the piston. The lower end of the piston rod carrying the cross pin moves within the bore of this thimble and the piston end is free to pass beyond the lower open end of the thimble as the spring is compressed.

It will be observed that after the grease is thoroughly packed within the container by depression of the handle and downward movement of the follower plate, the spring will be compressed and this compression will be maintained due to the locking of the piston rod in its depressed position. As the grease is extracted or sucked from the lower end of the container by means of the pump piston, the quantity of grease is decreased and the piston moves against the grease under the action of the spring until the cross pin again contacts the head of the thimble.

To thoroughly break the suction between the piston and grease and to prevent the formation of any vacuum below the piston, when it is desired to elevate the same for refilling, a valve plate 53 is suspended from the underside thereof. This valve plate is also of dished form providing an entirely vertical rim having a rounded edge adapted to abut the plain undersurface of the follower plate. This valve plate is hung on a pair of studs 54 riveted in place in the valve plate and extending upwardly and slidably through bores in the follower plate. Cotter pins 55 are provided extended through the extreme upper ends of the studs above the follower plate for engaging the upper surface of the follower plate and for limiting downward movement of the valve plate relative to the follower plate. By the use of these studs 54, the follower plate is guided in its movement and the cotter pins 55 are arranged for permitting ample relief clearance between the valve plate and the follower piston whereby atmospheric pressure may be admitted through apertures 56 in the follower plate and thence between the rim and follower plate into the region between the follower plate.

The apertures 56 in the follower plate or piston (see Figure 2) are disposed within the area enclosed by the valve plate. The valve plate also includes a central concave portion 57 for clearing the space below the thimble for permitting additional movement of the piston rod. This concave portion aids in the operation of the valve or relief device in that it provides additional surface on the valve plate for contact with the grease, which additional surface area is not horizontally disposed across the surface of the grease but is slightly extended into the same for insuring a more positive suction grip. This device, which is termed a relief valve, is forced against the follower plate as the plate is moved downwardly thereby effectively sealing the piston against the passage of grease through the relief openings 56.

The rim 58 of the valve element contacting the follower plate relatively close to the outer edge thereof, encloses or covers substantially the entire lower surface of the follower plate. The moment an upward force is exerted on the follower plate, the tendency is for the suction to cause the valve plate to cling to the grease.

It can readily be appreciated that with highly packed grease, a tremendous suction is exerted on the underside of the follower plate. By the present arrangement, this suction is almost entirely effective on the valve plate. The atmospheric pressure upon the top of the follower plate would almost totally prohibit elevation of the follower piston if there were not some way for admitting the atmospheric pressure through to the grease.

As the operator starts to move the follower plate upwardly, there is a suction created by contact of the grease with the piston which resists upward movement of the piston. The valve of the present improvement immediately opens communication between the two chambers at the opposite sides of the follower plate since a very slight movement of the follower plate withdraws the follower plate or piston from the valve which is held by suction upon the body of grease and the air passes through the openings in the follower plate and over the rim of the valve to the grease whereupon the pressures on both sides of the piston are balanced and piston upward travel is possible.

Having described my invention, I claim:

1. In a device of the class described, including a main piston including a main body and a gasket, and a cylindrical reservoir closed at its upper end and having a discharge port at its lower end; a valve plate suspended axially from said piston and having a sealing edge adapted to engage the underside of the main body of said piston and cover the major portion thereof, said piston having openings therethrough in the area covered by the valve plate, the mounting of the valve plate relative to the piston permitting a slight disengagement of the valve plate from the piston, and a depressed portion formed centrally of said valve plate.

2. A device of the class described, including a main piston including a main body and a gasket, and a reservoir cylinder closed at its upper end and having a discharge port at its lower end; a dish-shaped valve plate mounted in suspension from said piston axially thereof and having its rim edge adapted to sealingly engage the underside of the main body of said piston, said piston having openings therethrough in the area covered by the valve plate, the mounting of the valve plate relative to the piston permitting a slight disengagement of the valve plate rim edge from the piston.

In witness whereof, I hereunto subscribe my name.

CLYDE G. BUTLER.